United States Patent [19]
Mattes et al.

[11] Patent Number: 6,099,907
[45] Date of Patent: Aug. 8, 2000

[54] STABLE, CONCENTRATED SOLUTIONS OF HIGH MOLECULAR WEIGHT POLYANILINE AND ARTICLES THEREFROM

[75] Inventors: Benjamin R. Mattes, Sante Fe; Hsing-Lin Wang, Los Alamos, both of N. Mex.

[73] Assignee: The Regents of the University of California, Los Alamos, N. Mex.

[21] Appl. No.: 09/334,718

[22] Filed: Jun. 16, 1999

Related U.S. Application Data

[62] Division of application No. 08/926,338, Sep. 5, 1997, Pat. No. 5,981,695, which is a continuation of application No. 08/658,928, May 31, 1996, abandoned.

[51] Int. Cl.[7] .............................. B05D 3/04; B05D 3/02; C08J 3/00
[52] U.S. Cl. ..................... 427/336; 427/385.5; 528/422; 528/492
[58] Field of Search ................................ 427/385.5, 336; 528/422, 492

[56] References Cited

U.S. PATENT DOCUMENTS

| | | |
|---|---|---|
| 5,135,682 | 8/1992 | Cohen . |
| 5,147,913 | 9/1992 | MacDiarmid . |
| 5,278,213 | 1/1994 | Han et al. ................................ 528/422 |
| 5,312,686 | 5/1994 | MacDiarmid . |
| 5,583,169 | 12/1996 | Wrobleski . |
| 5,804,100 | 9/1998 | Angelopoulos . |

OTHER PUBLICATIONS

A.G. MacDiarmid et.al., "Polyaniline: Synthesis and Characterization of the Emeraldine Oxidation State by Elemental Analysis," Conducting Polymers, L. Alcacer, ed., Riedel Pub., 1986.

E.J. Oh et al., "Polyaniline: Dependency Of Selected Properties On Molecular Weight," Synthetic Metals 55–57, 977 (1993).

A. G. MacDiarmid et al., "Towards Optimization of Electrical and Mechanical Properties of Polyaniline: Is Cross–Linking Between Chains the Key?" Synthetic Metals 55–57, 753 (1993).

K. T. Zou et al., "Improved Solution Stability And Spinnability Of Concentrated Polyaniline Solutions Using N,N'–Dimethyl Propylene Urea As The Spin Bath Solvent," Synthetic Metals 69, 109 (1995).

C.–H. Hsu et al., "Polyaniline Spinning Solutions and Fibers," Synthetic Metals 59, 37 (1993).

Debra A. Wrobleski et al., "Stabilization of Polyaniline Solutions," Polymer Preprints 35, 267 (1994).

M. Angelopoulos et al., "LiCl Induced Morphological Changes In Polyaniline Base and Their Effect on the Electronic Properties of the Doped Form," Macromolecules 29, No. 8, 3046 (1966).

*Primary Examiner*—Tae Yoon
*Attorney, Agent, or Firm*—Samuel M. Freund

[57] ABSTRACT

Stable, concentrated solutions of high molecular weight polyaniline. In order to process high quality fibers and other articles possessing good mechanical properties, it is known that solution concentrations of the chosen polymer should be in the range from 15–30% (w/w). Moreover, it is desirable to use the highest molecular weight consistent with the solubility properties of the polymer. However, such solutions are inherently unstable, forming gels before processing can be achieved. The present invention describes the addition gel inhibitors (GIs) to the polymer solution, thereby permitting high concentrations (>15% (w/w)) of high molecular weight (($M_w$)>120,000, and ($M_n$)>30,000) emeraldine base (EB) polyaniline to be dissolved. Secondary amines have been used for this purpose in concentrations which are small compared to those which might otherwise be used in a cosolvent role therefor. The resulting solutions are useful for generating excellent fibers, films, coatings and other objects, since the solutions are stable for significant time periods, and the GIs are present in too small concentrations to cause polymer deterioration. It is demonstrated that the GIs found to be useful do not act as cosolvents, and that gelation times of the solutions are directly proportional to the concentration of GI. In particular, there is a preferred concentration of GI, which if exceeded causes structural and electrical conductivity degradation of resulting articles. Heating of the solutions significantly improves solubility.

26 Claims, 5 Drawing Sheets

($\sigma \sim 10^{-10}$ S/cm) $\xrightarrow{H^+A^-}$

STABLE, CONCENTRATED SOLUTIONS OF HIGH MOLECULAR WEIGHT POLYANILINE AND ARTICLES THEREFROM

This application is a divisional of patent application Ser. No. 08/926,338, filed on Sep. 05, 1997, now U.S. Pat. No. 5,981,695, which is a file wrapper continuation of Ser. No. 08/658,928, filed on May 31, 1996, now abandoned.

This invention was made with government support under Contract No. W-7405-ENG-36 awarded by the U.S. Department of Energy. The government has certain rights in the invention.

FIELD OF THE INVENTION

The present invention relates generally to the preparation of solutions of polyaniline and, more particularly, to the preparation of concentrated solutions (between 15% and 30% (w/w)) having molecular weights with weight averages $(M_w) > 120,000$ and number averages $(M_n) > 30,000$ in the emeraldine base form of polyaniline, which may be processed into films, coatings, and fibers that are highly electrically conducting after subsequent exposure to acid.

BACKGROUND OF THE INVENTION

Dopable p-conjugated polymers (alternating double and single bonds along the polymer main chain repeat units), such as those found in the family of polymers known as polyaniline, show potential for a variety of commercial applications such as chemical separations, electromagnetic interference shielding, protection of metals from corrosive environments, antistatic coatings, and current-carrying fibers. Polyaniline is a commercially attractive polymer since, unlike many other dopable p-conjugated polymers, it is both environmentally stable and can be made electrically conducting by acid treatment.

Electrical conductivity ($\sigma$) of $\pi$-conjugated polymers is physically possible due to electron mobility along (intrachain) and between (interchain) polymer chains in a solid-state article. The magnitude of the conductivity depends upon the number of charge carriers (n) which is determined by the extent of doping with oxidizing or reducing chemical agents (or in the special case of polyaniline, with an acid), the charge on these carriers (q), and on the combined interchain and intrachain mobilities ($\mu$). These relationships are related by:

$$\sigma = n\, q\, \mu$$

In order to obtain high conductivities, n is usually maximized by a chemical doping process (generation of electrons or holes on the polymer chain), so that conductivity becomes dependent on the mobility of the carriers. At the maximum doping levels, it is the mobility of the charge carriers which must be increased to obtain higher conductivity. Mobility of charge carriers in some cases depends upon the polymer's morphology once it is "frozen" into a nonequilibrium glassy solid state article determined by processing conditions. Interchain mobility depends upon the statistical distribution of conformational features such as bond and torsion angles, interchain distances, packing density, orientation, fractional crystallinity, free volume, etc. On the other hand, intrachain mobility depends upon the degree and extent of $\pi$-conjugation and defects along the polymer chains, and the polymer chain conformations. It is therefore desirable to develop improved processing procedures which allow control over the factors governing mobility in order to generate higher conductivities in polyaniline.

Polyaniline in its most useful and environmentally stable oxidation state is given the name emeraldine base (EB). The untreated EB is itself an electrical insulator composed of tetrameric repeating units each containing two secondary amine and two tertiary imine nitrogen atoms as shown in FIG. 1a hereof. When powders of EB are treated with acid solutions, the imine nitrogen atoms extract protons from solution with the acid counterion associating with the polymer chain to maintain overall charge neutrality. When less than 50% of the available imine nitrogens are coordinated to form quaternary iminium salt complexes, i.e., immersion in pH's between 2 and 7, the polymer becomes a semiconductor and is called a bipolaron (See FIG. 1b hereof), since charge carriers delocalized along the $\pi$-conjugated polymer backbone are spinless. Immersion in more concentrated acid solutions (pH<2) generates polarons (See FIG. 1c hereof) since, due to self-localized reorganization of electronic states, the mobile charge carriers are now sufficiently delocalized to produce mobile spins. Thus, treatment of EB (which has a conductivity of less than $10^{-10}$ Siemen/cm [S/cm]) with an excess of concentrated acid solution (pH<1) results in an electrically conductive polymer having a conductivity of about 1 S/cm. Under these latter doping conditions, the maximum number of charge carriers (n) have been generated on the polymer since all of the nitrogen atoms, available as protonation sites, are occupied.

The commonly reported polyaniline synthesis describes the heterogeneous radical chain polymerization of aniline at 0° C. in 1 N aqueous HCl, and leads to the acid salt form of polyaniline (See e.g., A. G. MacDiarmid et.al., "Conducting Polymers", Alcacer, L., ed., Riedel Pub., 1986, p.105, FIG. 1c). When this polyaniline powder is immersed in an excess of a strong aqueous base, it is deprotonated to yield EB (See FIG. 1a hereof). Most polyaniline investigations have employed materials having molecular weights with weight average $(M_w) < 100,000$ and number average $(M_n) < 30,000$ which are produced by these synthetic conditions (See, e.g., E. J. Oh et al., "Polyaniline: Dependency Of Selected Properties On Molecular Weight," Synthetic Metals, 55–57, 977 (1993).

In U.S. Pat. No. 5,312,686 for "Processable, High Molecular Weight Polyaniline And Fibers Made Therefrom," which issued to Alan G. MacDiarmid et al. on May 17, 1994, a procedure for preparing high molecular weight polyaniline is reported. The method involves reducing the standard reaction temperature to –30° C., by adding 5 M LiCl to the reaction mixture, thereby producing high-molecular-weight EB. The molecular weight of the resulting polymer may be varied from $(M_w) = 250,000$ to greater than $(M_w) = 400,000$ by controlling the rate at which the initiator is added to the cold reaction mixture, and the reaction temperature. These high molecular-weight polyanilines exhibit poor solubility and have short gelation times. A complex cycling procedure of acid doping, followed by undoping with aqueous base reportedly led to improved solubility and concentrated solutions in N-methyl-2-pyrrolidinone (NMP). Unfortunately these solutions were discovered to rapidly gel when prepared in the 1–3% w/w range in NMP. Thus, there exists a need for developing procedures to process high molecular weight polyaniline.

The utility of polyaniline EB with $(M_w) > 100,000$ and $(M_n) > 30,000$ has been limited. However, in order to process high quality fibers possessing good mechanical properties, it is known in the art that solution concentrations of a particular polymer should be in the 15–30% (w/w) range. Moreover, it is desirable to use the highest molecular weight polymers that will dissolve in solvents in the target concentration range. Tensile strength and modulus, flex life, and impact strength all increase with increasing molecular weight. Typically, molecular weights $(M_w)$>120,000 and $(M_n)$>30,000 are preferred. Such solutions are suitable for dry-wet or wet-wet fiber spinning processes that produce high quality fibers, and also for the generation of films, coatings and other useful objects.

The EB form of polyaniline is reported to be soluble in NMP at the 1–5% weight level. Such solutions may be cast into dry dense films after the wet film is thermally treated to remove the solvent. Films prepared in this manner, when immersed in a concentrated acid solution, have a conductivity of between 1 and 5 S/cm. Few other organic solvents for EB, such as N,N,N'N'-tetramethyl urea and N,N'-dimethyl-propylene urea (DMPU) as examples, have been reported in the literature. All of these solvents have carbonyl functional groups, which tend to form strong hydrogen bonds between the carbonyl group of the solvent and the secondary amine groups of the EB, thus encouraging limited solubility at dilute concentrations prepared from low molecular weight polymer. However, solubilities of even low molecular weight EB (0° C. synthesis, $(M_w)$<100,000, $(M_n)$<30,000) in such solvents is poor (<1–5% w/w). Solutions prepared from NMP above this concentration range exhibit rapid gelation. See, e.g., E. J. Oh et al., supra). Oh et al. observed that the gelation time is both inversely proportional to the weight percent of EB in NMP and to its molecular weight. S. A. Chen et al. in "Conductivity Relaxation Of 1-Methyl-2-Pyrrolidinone-Plasticized Polyaniline Film", Macromolecules 28, 7645 (1995), have reported evidence for a strong hydrogen bond interaction of the C=O group from NMP with the secondary amine (NH) functional groups of EB. Presumably, it is the imine nitrogens from the polymer which are strongly attracted to hydrogen atoms of the secondary amines on adjacent chains. This strong attractive force promotes interchain hydrogen bonds which serve as physical cross-links between chains and leads to rapid gelation in EB solutions, or in the solid-state article (FIG. 2a).

Emeraldine base solutions can be processed into free-standing films. If such films are stretched over a hot pin before immersion in a concentrated acid solution, and then subsequently treated with an acid, conductivities of as great as 200 S/cm may be obtained. A. G. MacDiarmid et al., "Towards Optimization of Electrical and Mechanical Properties of Polyaniline: Is Cross-Linking Between Chains the Key?", Synthetic Metals, 55–57, (1993) 753, shows that stretch alignment of EB films [prepared from dilute (1–3% w/w) EB in N-methyl-2-pyrolidinone (NMP) solutions], over a hot pin at 120° C. to a 2–5x draw ratio, increases the films fractional crystallinity (from ~5 to 50%) and additionally increases the anisotropic conductivity of the maximally acid doped film from 1 to 200 S/cm, in the direction parallel to the stretch. Hence, this example demonstrates the importance of manipulating the parameters which control carrier mobility ($\mu$) in the solid-state articles to enhance physical properties such as conductivity.

Some researchers have reported preparation of EB solutions having >10% w/w from DMPU (See e.g., K. T. Tzou, R. V. Gregory, "Improved Solution Stability And Spinnability Of Concentrated Polyaniline Solution Using N,N-DimethylPropylene Urea As The Spin Bath Solvent" Synthetic Metals 69, 109–112, 1995). Here also, the investigators employed a synthetic procedure which yields low molecular weight EB $((M_w)$<100,000, $(M_n)$<30,000). The solutions were stable long enough for the authors to spin a fiber which exhibited high conductivity; however, the details of processing and the solubility limits are lacking, and the resulting mechanical properties of the fiber would be much improved if higher molecular weights were accessible in their solvent systems.

A second category of reported solvents for polyaniline includes acids, such as m-cresol, formic acid, methanesulfonic acid, sulfuric acid, as examples. Solubility derives from the basic nature of the EB polymer which forms ionic coordination complexes between the acid and the imine nitrogens of the polymer. Solubility increases as the strength of the acid increases (>10% w/w for sulfuric acid, 1–5% w/w in m-cresol and formic acid). It is doubtful that EB is truly dissolved in such acid solutions; rather, it is more likely that the solutions consist of a fine dispersion of polyaniline particles. Processing EB in such solutions is not desirable since 1. The solvents are hazardous; 2. Strong acids can either over-oxidize emeraldine or chemically substitute on the polymer rings; and 3. The resulting polymers tend to degrade if stored in solution for more than a few days. Additionally, even though partially soluble in acid media, EB fibers spun from acid solution have been found to be mechanically weak.

A major obstacle to the fabrication of commercially useful articles, such as high quality fibers, hollow fibers, or articles having other useful geometries, from solutions of polyaniline, therefore, is the poor solubility of the polymer in solvents suitable for processing using conventional polymer engineering methods. Such solutions exhibit a strong tendency to form gels on a relatively short time scale due to interchain hydrogen bond formation, even for dilute solutions. The instability is such that the solutions cannot be extruded through spinnerette orifices because they gel too rapidly or form particulate material which clogs the spinnerette tip, causing unsafe pressure increases in the spin line which represent a significant health risk to operators.

U.S. Pat. No. 5,135,682, for "Stable Solutions Of Polyaniline And Shaped Articles Therefrom, which issued to Jeffrey D. Cohen and Raymond F. Tietz on Aug. 4, 1992, discloses a procedure for preparing stable dry-wet spinning solutions of EB in the 10–30% w/w range. Stable, spinnable solutions were prepared using 1,4-diaminocyclohexane, 1,5-diazabicyclo (4.3.0) non-5-ene, or by dissolving EB in NMP with the addition of specified quantities of cosolvents consisting of either pyrrolidine (Py) [11% EB; 33% Py; and 56% NMP w/w/w] or ammonia. The amount of pyrrolidine added as cosolvents, compared to the amount of the EB added to NMP solution, can be expressed as the ratio of moles Py/ moles EB tetrameric repeat unit, which in their preferred embodiment is 15.5. (The molecular weight of the EB repeat unit is 362 g/mol, and that of Py is 71.13 g/mol). Poor quality fibers were observed for the NMP/Py solutions (See, e.g., ibid., Example 5). The work was further described in "Polyaniline Spinning Solutions and Fibers," by C.-H. Hsu, J. D. Cohen and R. F. Tietz, in Synthetic Metals 59, 37 (1993), where the authors suggested that the physical degradation of the polyaniline fibers, especially after exposure to an acid, was likely due to the addition of Py or ammonia cosolvents, as a result of chemical interactions between the cosolvents and the polymer. Molecular weights reported from the described synthetic procedure were approximately $(M_n)$=20,000 and $(M_w)$=120,000. Synthetic conditions were carried out at −8° C. without LiCl added to the reaction mixture.

In U.S. Pat. No. 5,147,913, for "Cross-Linked Polymers Derived From Polyaniline And Gels Comprising The Same," which issued to Alan G. MacDiarmid and Xun Tang on Sep. 15, 1992, the preparation of cross-linked polymers of polyaniline by providing a substantially linear polymer which comprises polyaniline and/or a polyaniline derivative, admixing the linear polymer with a liquid in which the cross-linked polymer is substantially insoluble, and cross-linking the polymer through agitation, is described. Preferred liquids for preparing such gels include NMP. A preferred embodiment for forming such gels is utilization of EB in NMP at concentrations >5% w/w.

In "Stabilization of Polyaniline Solutions," by Debra A. Wrobleski and Brian C. Benicewicz, Polymer Preprints 35, 267 (1994), the authors report the addition of hindered amine antioxidants and UV absorbers to up to 5% w/w solutions of EB in NMP to increase the gelation time for such solutions. Although molecular weights for the EB are not reported, the described synthesis must have produced EB with weight average molecular weights below $(M_w)$ <100,000 and number averages $(M_n)$<30,000.

Accordingly, it is an object of the present invention to provide a method for dissolving high concentrations (between 15% and 30% by weight) of high molecular weight polyanilines (weight averages $(M_w)$>120,000 and number averages $(M_n)$>30,000) without significant gel formation over a time period sufficient to process the solution obtained thereby into articles.

Another object of the invention is to provide a method for preparing solutions having high concentrations (between 15% and 30% by weight) of high molecular weight polyanilines ($(M_w)$>120,000 and $(M_n)$>30,000) from which articles can be prepared having improved electrical conductivities and mechanical properties.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method for preparing solutions having between 15% and 30% by weight of $(M_w)$>120,000, $(M_n)$>30,000 EB form of polyaniline hereof includes: mixing a solvent for polyaniline with a secondary amine such that the molar ratio of secondary amine to polyaniline tetramer repeat unit is between 0.1 and 5.0, forming thereby a solution; and dissolving the polyaniline in the solution thus prepared.

In another embodiment of the invention, in accordance with its objects and purposes, as embodied and broadly described herein, the method for preparing solutions having between 15% and 30% by weight of $(M_w)$>120,000, $(M_n)$ >30,000 EB form of polyaniline hereof includes: dissolving a chosen amount of polyaniline in a bifunctional solvent therefor having both an amide group and a secondary amine group, forming thereby a solution.

In yet another embodiment of the invention, in accordance with its objects and purposes, as embodied and broadly described herein, the method for preparing polyaniline fibers hereof includes: preparing a solution having between 15% and 30% by weight of $(M_w)$>120,000, $(M_n)$ >30,000 EB form of polyaniline by mixing a solvent for polyaniline with a secondary amine such that the molar ratio of secondary amine to polyaniline tetramer repeat unit is between 0.1 and 5.0, forming thereby a solution, and dissolving a chosen quantity of polyaniline in the solution thus prepared; extruding the solution to form a fiber; passing the extruded fiber through an air gap; conveying the fiber through a coagulation bath, wherein the fiber cools and solidifies and wherein the solvent and gel inhibitor are removed; and drying the cooled and solidified fiber.

In still another embodiment of the invention, in accordance with its objects and purposes, as embodied and broadly described herein, the method for preparing polyaniline fibers hereof includes: preparing a solution having between 15% and 30% by weight of $(M_w)$>120,000, $(M_n)$ >30,000 EB form of polyaniline by dissolving a chosen amount of polyaniline in a bifunctional solvent therefor having both an amide group and a secondary amine group; extruding the solution to form a fiber; passing the extruded fiber through an air gap (dry-wet) or no air gap (wet-wet); conveying the fiber through a coagulation bath, wherein the fiber cools and solidifies and wherein the solvent and gel inhibitor are removed; and drying the cooled and solidified fiber.

In another embodiment of the invention, in accordance with its objects and purposes, as embodied and broadly described herein, the method for preparing polyaniline films hereof includes: preparing a solution having between 15% and 30% by weight of $(M_w)$>120,000, $(M_n)$>30,000 EB form of polyaniline by mixing a solvent for polyaniline with a secondary amine such that the molar ratio of secondary amine to polyaniline tetramer repeat unit is between 0.1 and 5.0, forming thereby a solution, and dissolving a chosen quantity of polyaniline in the solution thus prepared; coating a substrate with the solution; and thermally annealing the coated substrate.

In yet another embodiment of the invention, in accordance with its objects and purposes, as embodied and broadly described herein, the method for preparing polyaniline films hereof includes: preparing a solution having between 15% and 30% by weight of $(M_w)$>120,000, $(M_n)$ >30,000 EB form of polyaniline by dissolving a chosen amount of polyaniline in a bifunctional solvent therefor having both an amide group and a secondary amine group; coating a substrate with the solution; and thermally annealing the coated substrate.

In still another embodiment of the invention, in accordance with its objects and purposes, as embodied and broadly described herein, the method for preparing polyaniline films hereof includes: preparing a solution having between 15% and 30% by weight of $(M_w)$>120,000, $(M_n)$ >30,000 EB form of polyaniline by mixing a solvent for polyaniline with a secondary amine such that the molar ratio of secondary amine to polyaniline tetramer repeat unit is between 0.1 and 5.0, forming thereby a solution, and dissolving a chosen quantity of polyaniline in the solution thus prepared; coating a substrate with the solution; immersing the coated substrate into a nonsolvent bath, whereby the polyaniline precipitates forming a film; and drying the film.

In another embodiment of the invention, in accordance with its objects and purposes, as embodied and broadly described herein, the method for preparing polyaniline films hereof includes: preparing a solution having between 15% and 30% by weight of $(M_w)$>120,000, $(M_n)$>30,000 EB form of polyaniline by dissolving a chosen amount of polyaniline in a bifunctional solvent therefor having both an amide group and a secondary amine group; coating a substrate with the solution; immersing the coated substrate into a nonsolvent bath, whereby the polyaniline precipitates forming a film; and drying the film.

Benefits and advantages of the present invention include the preparation of stable, particle-free solutions suitable for producing high quality articles therefrom from noncaustic and recoverable solvents.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings:

FIG. 1 is a schematic representation of the repeat unit for polyaniline, where FIG. 1b illustrates the semiconducting (bipolaron) form obtained by immersion of the polymer in acid solutions having a pH in the range between 7 and 2, while

FIG. 2 is a schematic representation of interchain hydrogen bonding in EB, FIG. 2a illustrating the interaction between imine nitrogens on one chain and the hydrogen atom bonded to the secondary amine of an adjacent chain, while

DETAILED DESCRIPTION

Briefly, the present invention includes the addition of gel inhibitors (GIs) to solutions of EB in order to permit high concentrations (between 15% and 30% by weight) of high molecular weight polyanilines (($M_w$)>120,000, and ($M_n$) >30,000) to remain stable and particle-free for sufficient time to fabricate desired articles therefrom. For example, production of high quality fibers possessing good mechanical properties requires concentrations of the chosen polymer in the 15–30% (w/w) range. It is demonstrated that the GIs found to be useful do not act as cosolvents, and that gelation times of the solutions are directly proportional to the concentration of GI. In particular, there is a preferred concentration of GI, which if exceeded causes structural and electrical conductivity degradation of resulting articles. Heating of the solutions significantly improves solubility.

Figure 2A:
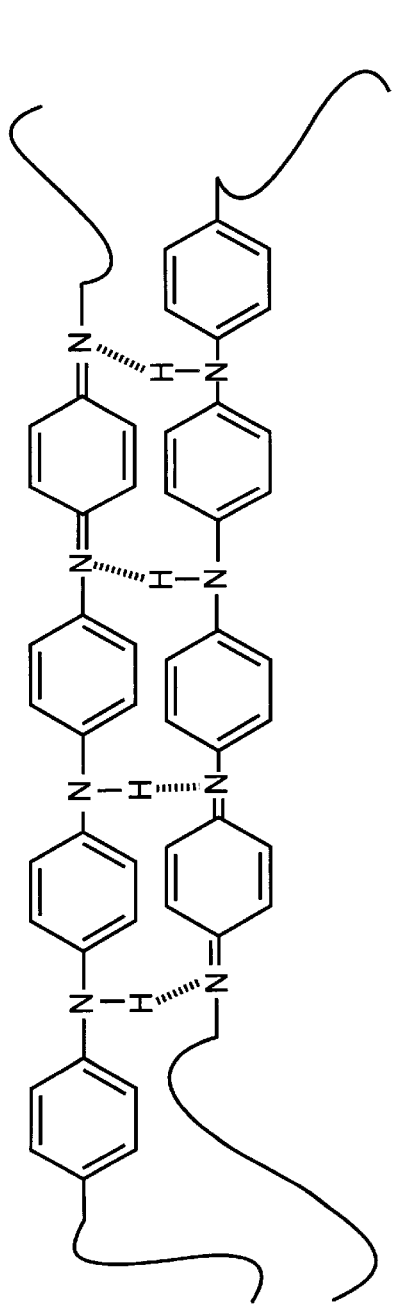

Reference will now be made in detail to the present preferred embodiments of the invention. As stated hereinabove, NMP, N,N,N'N'-tetramethylurea, and DMPU are the best known solvents for EB. Higher concentrations of EB(>5% w/w) in such solvents lead to rapid gelation due to strong intermolecular H-bonding between polyaniline chains, and decreases in the solubility of EB are directly related to increases in the molecular weight of the polymer. The interaction between the amine functionality of the EB tetramer repeat unit and the carbonyl (C=O) or phosphonyl (P=O) or sulfonyl (S=O) groups of these solvents is thought to be responsible for the solubility of this material in such solvents. It is important to note that the imine nitrogens are not presumed to be hydrogen bonded with the solvent molecules. If the solute concentration is <2% w/w, intermolecular H-bonding between EB molecules is less likely to occur in view of the increased spacing between the molecules. Thus, such solutions remain stable and particle-free for a significant amount of time. However, as the concentration is increased, EB molecules become more closely disposed and a number of the secondary amine nitrogens unbonded by the solvent may H-bond to the imine nitrogens between adjacent polymer chains. See, e.g., FIG. 2a hereof. Gelation will then occur in a shortened time period, and stable, particle-free solutions become difficult to prepare. It is recognized that for EB molecular weights $M_w$>100,000, such H-bonding may occur in very short times for solutions having <1% w/w of EB.

Figure 2B:
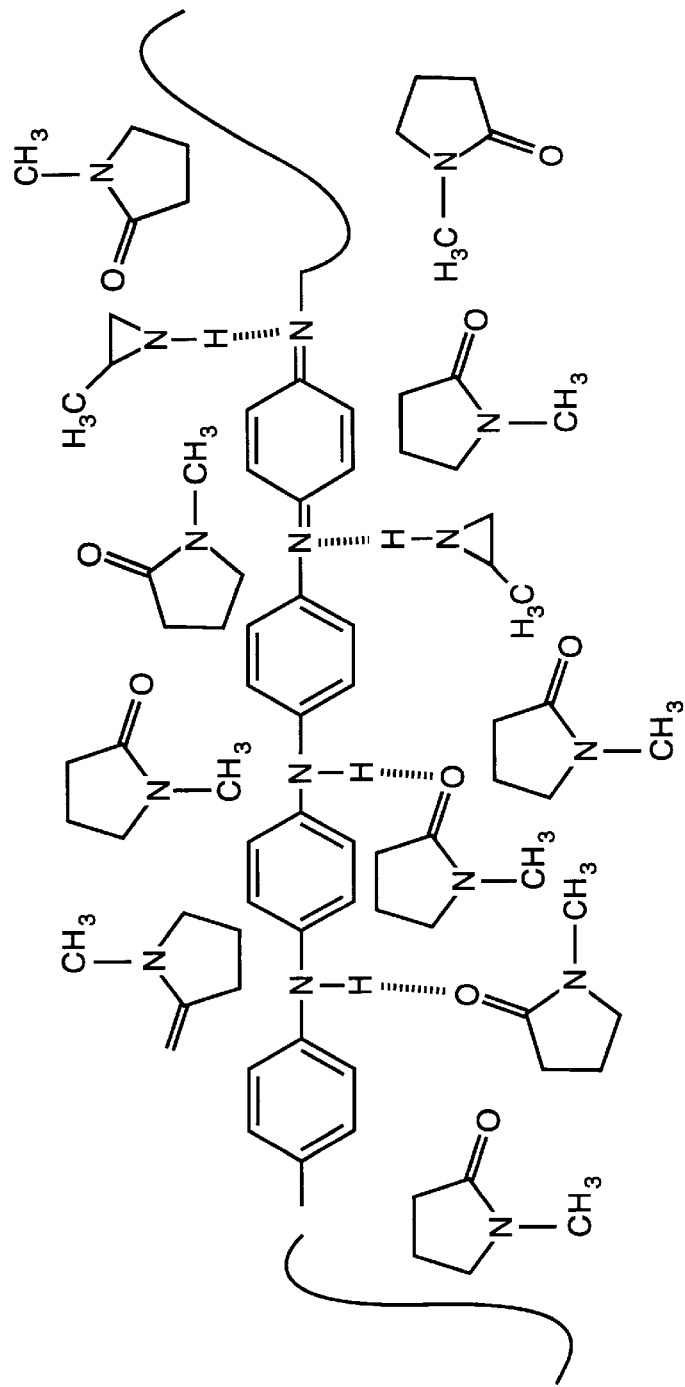
FIG. 2b illustrates one of the gel inhibitors (GIs) of the present invention, 2-methylaziridine, forming hydrogen bonds with the imine nitrogens of a solvated EB chain, thereby inhibiting the interchain polymer associations through the hydrogen bond formation mechanism illustrated in FIG. 2a, hereof, and further forming a dielectric shield by screening the imine nitrogens, thereby producing enhanced solubility in the presence of a solvent such as N-methyl-2-pyrrolidinone (NMP).

An approach to this problem, according to the teachings of the present invention, is to introduce a gel inhibitor to the solutions as an additive which subsequently complexes with the tetramer repeat unit imine nitrogens, thereby providing a "dielectric shield" which inhibits the natural tendency for EB chains to aggregate and gel at high concentrations by formation of interchain imine-amine hydrogen bonds. See, e.g., FIG. 2B hereof. Such additives are used in small amounts in a range of molar ratios of GI to EB tetramer repeat unit of 0.1 to 5.0, and more preferably in the range of 0.5 to 3.0, and most preferably in the range from 1 to 2. Greater quantities of gel-inhibitors, as might be used if one were using cosolvents, have been found to seriously deteriorate the resulting polymer articles by embrittlement. This is especially true following doping with an acid after thermal evaporation of the solvent, so as to render the article conductive. An article with poor mechanical properties and/or significantly reduced conductivities results. Films, fibers, and/or other articles disclosed by the present invention can be prepared by immersion precipitation (IP) into a nonsolvent coagulation bath and thereby retain excellent mechanical properties, e.g., flex, modulus, etc., and may also be rendered highly conductive after exposure to an acid.

The preparation of polyaniline used in these experiments is now described. Such high molecular weight materials are also readily prepared by emulsion polymerization procedures (See Y. Cao and J. Osterholm, "Electrically Conducting Polyaniline: Method for Emulsion Polymerization", U.S. Pat. No. 5,324,453, issued 1994.). The solubility characteristics of these high molecular weight polyaniline emeraldine bases behave identically to those described herein.

Figure 1A:
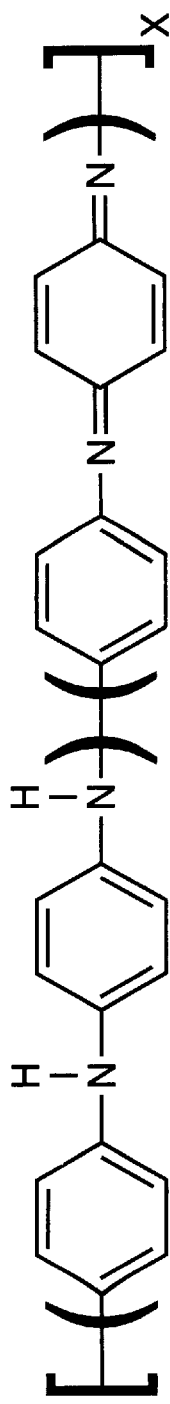
FIG. 1a illustrates the EB form thereof.
Figure 1B:
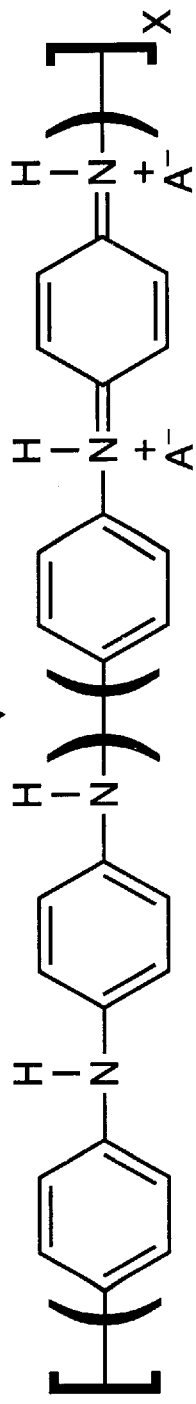
Figure 1C:
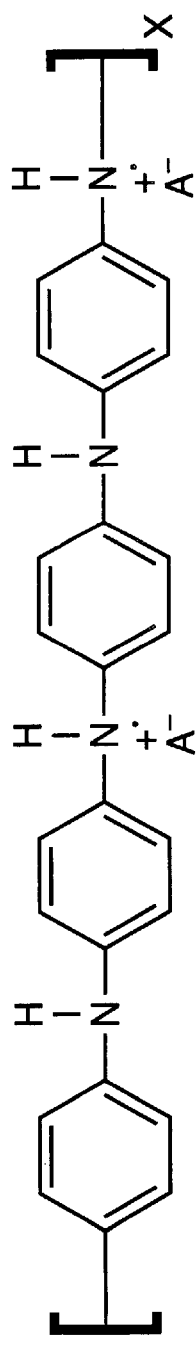
FIG. 1c illustrates the highly conducting (polaron) form obtained by immersion of the polymer in acid solutions having a pH<2.

High molecular weight polyaniline is synthesized at −45° C. using a cyclohexanone/$CO_2$ ice bath. In a typical reaction, 100 g (1.074 mole) of aniline were dissolved in 1500 ml of 1 M HCl and aqueous 5 M LiCl solution. The solution was transferred to a 4 L resin kettle, and subsequently immersed in a cyclohexanone/$CO_2$ ice bath, where it was mechanically stirred throughout the course of the reaction. After 1 h. the reaction temperature of the aniline solution reached a temperature of −45° C. Ammonium persulphate [131 g (0.574 mole)] was dissolved in a separate flask which contained 1200 ml of 1 M HCl and 5M LiCl solution at room temperature. This oxidant solution was added to the aniline solution at a rate of 8 mL/min. by means of a metered syringe pump. Thirty minutes after the first additions of ammonium persulphate solutions the reaction mixture appeared pink in color, changing to intense orange after about 3 h. Twenty-four hours later, the solution was bluish green in color, indicating the formation of doped polyaniline in its emeraldine hydrochloride form (FIG. 1c). The reaction mixture was left with continuous vigorous stirring at −45° C. for an additional 48 h. At that time the temperature of the reaction mixture was allowed to slowly increase 0° C. The resulting polyaniline emeraldine hydrochloride powder occupied the entire volume of the reaction flask, and it appeared very bulky and fibrous as compared to polyaniline emeraldine hydrochloride powders prepared at 0° C. without LiCl.

The emeraldine hydrochloride powder was collected by vacuum filtration and subsequently washed with 2 L increments of 1 M HCl until the filtrate became colorless. The powder was then washed with 2 L of water and transferred to a 4 L beaker containing 2.5 L of 0.1 N $NH_4OH$ solution, stirred for 1 h., and subsequently vacuum filtered to collect the deprotonated EB powder (FIG. 1a). The polymer was reacted with another 2.5 L of 0.1 N $NH_4OH$ aqueous solution for another hour, and subsequently vacuum filtered to recover the EB powder. The EB polymer was dried under dynamic vacuum at $10^{-2}$ torr for more than 72 hours to remove residual water. Polymer yields were typically 40 to 45%. An identical synthetic procedure was performed at a slightly higher reaction temperature of −15° C. utilizing a polyethylene glycol/ dry ice slurry as the cooling bath.

The molecular weight of polyaniline synthesized at −15° C. and −45° C. in 5M LiCl/1 M HCl have similar molecular weights as indicated in Table 1 which shows gel permeation chromatography (GPC) results for high molecular weight polyanilines synthesized under the varying conditions described above. The measurements of molecular weight were performed using GPC on 0.1% (w/w) solutions of EB in NMP at room temperature with a linear column with a UV detector monitoring 320 nm transmitted light. Molecular weights were derived from polystyrene standards analyzed under identical elution conditions. The polydispersity of the samples ($M_w/M_n$) was difficult to determine accurately due to poor chromatographic resolution of the bimodal peak distributions.

TABLE 1

| Sample | Synthetic Conditions | $M_n$ | $M_w$ |
|---|---|---|---|
| 1 | −15° C., 5 MLiCl, 1M HCl | 33,371 | 618,614 |
| 2 | −15° C., 5 MLiCl, 1M HCl | 67,016 | 680,501 |
| 3 | −45° C., 5 MLiCl, 1M HCl | 70,033 | 494,785 |

It is known that the GPC analysis of the synthesized EB in NMP solution has a bimodal molecular weight distribution. This is likely due to the aggregation of the polyaniline in the NMP. Such phenomenon may be resolved by adding the LiCl to the NMP solution. The GPC results presented in Table 1 were obtained without the addition of LiCl to the NMP solutions for comparison to known reference chromatograms. It is clear that each of the polyaniline samples is of high molecular weight, $(M_w)$>120,000 and $(M_n)$>30,000. It is also apparent that the molecular weight of these samples is significantly higher than the polyaniline synthesized at 0° C. (See M. Angelopoulos, et al, "LiCl Induced Morphological Changes in Polyaniline Base and Their Effect on the Electronic Properties of the Doped Form", Macromolecules, 29, 8, 3046) without LiCl added to depress the freezing point of water in the reaction mixture, as is most frequently cited in the literature.

It is a simple undertaking to survey additional compounds for their utility as gel inhibitors and/or solvents which are not presently set forth herein. It is similarly straightforward to determine which gel inhibitors and solvents do not perform well. Those skilled in the art will appreciate the simplicity of the following gel inhibitor (or new solvent) rapid screening procedure. Typically, the weight of a new potential gel inhibitor (GI) is adjusted to give a GI/EB mole ratio of about 0.5–3.0 in a known (or candidate) solvent. The GI and solvent mixture is placed in an oven at 60° C. for 10 min. in a tightly sealed chemically resistant polytetrafluoroethylene (PTFE) container. It is possible to perform this screening with candidate gel inhibitors or solvents at temperatures up to the decomposition temperature of the EB (~320° C.). Sufficient EB powder is then rapidly added to the mixture with vigorous stirring and returned to the oven for 5 min. time intervals. After several short heating intervals (with repetitive stirring), if a fluid, particle-free flowable liquid is obtained, then a viable gel inhibitor (or solvent) has been identified. The solution is subsequently spread onto two separate glass, metal, ceramic, or plastic plates, and formed into flat wet film sheets of desired thickness by means of a gardener blade. One plate is subjected to a 120° C. convective oven for 1–2 h. (a thermally annealed film or coating), while the other is immediately immersed into a polymer nonsolvent bath (typically water) for more than 10 h. (an IP film).

The respective as cast thermally annealed films (or coatings) may then be immersed in any desirable pH solution for several hours, removed and air dried. A standard four point probe method (See Vander Pauw, L. J. Phillips Technical Review 20, 220 (1958)) for determining the bulk electrical conductivity is employed . The thickness of the porous film is generally adjusted in the range from 2 to 4 mil (50–100 micron). After it is removed from the nonsolvent bath, such films are immersed into 1 N HCl for 1 h. These films have a short time lag to achieve the maximally doped state. The thermally cured dense films require longer doping intervals, presumably due to their lower fractional free volumes. After the films are removed from the acid solution, they are wiped dry and air dried for ~1 h., and conductivity measurements are taken.

Figure 5:
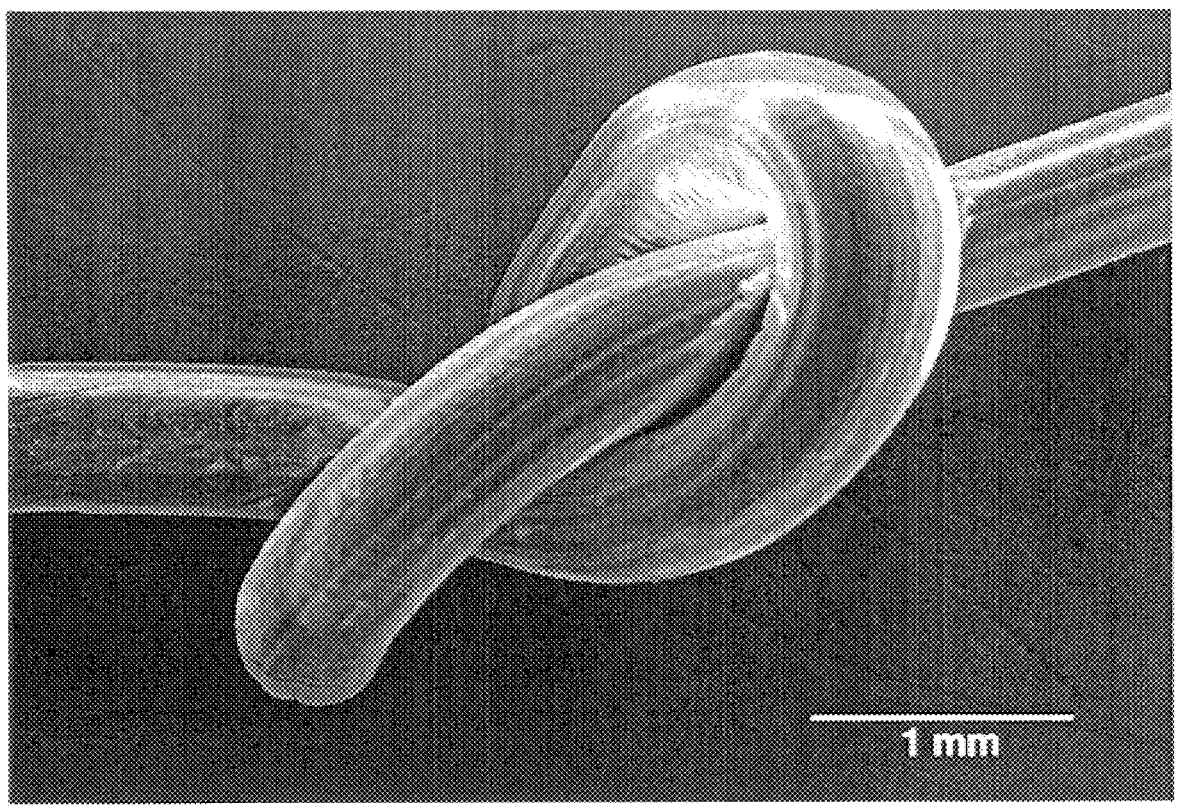
FIG. 5 shows an EB fiber prepared from a stable 20% (w/w) solution by dry-wet spinning having been tied in a knot which demonstrates substantial mechanical strength, such fibers, after stretch alignment and acid doping, being observed to have electrical conductivities >20 S/cm.

The mechanical integrity of an acid-doped film is generally determined by a simple flex test: if the film can be manually flexed 180° without breaking, it is considered to be flexible (F); if it fractures or breaks it is considered brittle (B). If the film or coating does not easily delaminate during the peel off from the casting substrate, and if the film or coating substrate is scratched from the perimeter with a razor blade so that the polymer flakes or shatters into pieces, it is considered very brittle (VB). If the film (especially IP films) can be manually flexed between 90° to 180° without breaking, it is considered somewhat flexible (SF). Similarly, when surveying fibers prepared according to the teachings of the present invention, an initial test of mechanical integrity is the ability of the fiber to be tied into a knot (FIG. 5).

More sophisticated electrical and mechanical testing may follow the rapid screening procedure described above, or it may be desirable, for instance, to vary the GI/EB molar ratio in the preferred range of the present invention; however, the simplicity of the aforementioned procedure has allowed the present inventors to rapidly determine that the following compounds were not effective gel inhibitors: aniline, N-methylpyrrolidine, pyrrole, pyridine, 1,1,1,3,3,3-hexafluoro-2-propanol. Similarly, it was found by this method that the following compounds were not effective solvents when used with exemplary gel inhibitors of the present invention: 1-methyl-4-piperidone, m-cresol, tetramethylene sulfone, glycol sulfite, p-xylene, 1,2 dichlorobenzene, dimethylformamide (DMF), formamide, tetrahydrofuran, triethylphosphate, N-methylacetamide, poly(ethylene glycol), dichloromethane, toluene, water, and methanol.

Having generally described the invention, the following examples are designed to instruct those skilled in the art of polymer processing on the practice of adding gel-inhibitors to solutions comprised of EB and a solvent in order to control solution viscosity, inhibit time to gelation, maintain particle and gel-free solutions, and to form films, fibers, coatings and other articles, which may be further treated to impart electrical conductivity.

EXAMPLE 1

A solution of 0.600 g ($8.44 \times 10^{-3}$ mole) of pyrrolidine (Py) combined with 0.490 g of NMP was heated to 68° C. for about 10 min;. 0.305 g ($8.43 \times 10^{-4}$ mole) of EB (21% w/w) were then added to the hot solution with stirring. This gave a GI/EB molar ratio of 10. The resulting mixture was stirred for several minutes. Most of the EB dissolved. After heating for an additional 5 min. a homogenous solution formed, and a dense film was produced by spreading the solution onto a glass plate which was then thermally annealed at 120° C. for approximately 2 h. to remove the casting solution. Another wet film was formed by spreading a portion of the solution onto a glass plate and immediately immersing it in a water bath whereupon the polymer precipitated to form a film. Both films were found to be very brittle before acid doping treatments, and the thermally annealed film was noticed to be more of a powder than a film when removed from the glass substrate by means of razor blade. This is in contrast to the same preparation performed with 1.02 g of NMP and 0.082 g ($1.16 \times 10^{-3}$ mole) of pyrrolidine, and 0.304 g of EB (GI/EB molar ratio=1.4) where a flexible, thermally cured dense film was obtained. This example clearly shows that a gel inhibitor such as pyrrolidine is not a cosolvent for polyaniline, and that, while providing enhanced solubility, a molar excess of Py, beyond the claims of the present invention, adversely effects the mechanical properties of the film or coating, most likely through physical degradation of the polymer.

EXAMPLE 2

To a solution of 0.621 g ($6.14 \times 10^{-3}$ mole) of dipropylamine and 0.512 g of NMP, which was heated at 68° C. for about 10 min., 0.305 g ($8.47 \times 10^{-4}$ mole) of EB was added (GI/EB=7.25), and the resulting solution stirred for several minutes. A pasty EB powder which did not dissolve the observed product was formed. Upon further heating for approximately 30 min., no solubility improvement was observed. Thus, a 20% w/w flowable liquid of EB was not possible to prepare under these conditions. This is to be contrasted to a solution of 1.02 g of NMP, 0.305 g ($8.47 \times 10^{-4}$ mole) of EB, and 0.108 g ($1.07 \times 10^{-3}$ mole) of dipropylamine (GI/EB=1.26) which, after the same heating procedure described above, generated a (20% w/w) polyaniline solution which could be formed into flexible films by thermal annealing or IP, and when doped in 1 N HCl gave high conductivity (>1 S/cm). This example shows that gel inhibitors such as dipropylamine are not cosolvents for polyaniline, but in fact, at elevated concentrations they are nonsolvents for the polymer.

Similarly, to a solution of 0.512 g of NMP and 0.550 g ($3.95 \times 10^{-3}$ mole) of decahydroquinoline, which was heated to 68° C. for about 10 min., 0.305 g ($8.43 \times 10^{-4}$ mole) of EB was added and the resulting mixture (GI/EB=4.72) stirred for several minutes. A clear solution was observed. The solution was heated for an additional 5 min., but a pasty precipitate and/or gel was observed. Upon attempting to cast this gel into a dense film, cracks were observed in the resulting film. This is in contrast to the same procedure applied to 1.0 g of NMP and 0.16 g ($1.15 \times 10^{-3}$ mole) of decahydroquinoline, where a 20% w/w polyaniline solution (GI/EB=1.36) was observed to be stable against gel formation for more than 10 min. at 68° C. This example shows the sensitivity of GI concentration to resulting gelation time and film quality.

EXAMPLE 3

The following secondary amines, which are themselves good gel inhibitors as described in the preferred embodiments of the present invention, were used as solvents in an attempt to make ~20% (w/w) flowable liquid solutions with EB at 60° C.: 1) 22 mg ($6.1 \times 10^{-5}$ mole) of EB was added to 80 mg ($7.8 \times 10^{-4}$ mole) of hot dipropylamine (GI/EB=12.8) with vigorous mixing, but the dipropylamine only wet and swelled the EB powder; 2) 20 mg ($5.5 \times 10^{-5}$ mole) of EB was added to 79 mg ($6.1 \times 10^{-4}$ mole) of dibutylamine (GI/EB=11.1), but the dibutylamine only wet and swelled the EB powder; 3) 22 mg ($6.1 \times 10^{-5}$ mole) of EB was added to 79 mg ($9.5 \times 10^{-4}$ mole) of 1,2,3,6-tetrahydropyridine (GI/EB=15.6), it immediately gelled upon mixing with the EB powder; 4) 21 mg ($5.2 \times 10^{-5}$ mole) of EB was added to 80 mg ($7.1 \times 10^{-4}$ mole) of heptamethyleneimine (GI/EB=12.2), but the heptamethyleneimine only wet and swelled the EB powder; and, 5) 19 mg ($5.2 \times 10^{-5}$ mole) of EB was added to 80 mg ($6.9 \times 10^{-4}$ mole) of 2,6-dimethylmorpholine (GI/EB=13.3), but the 2,6-dimethylmorpholine only wet and swelled the EB powder. These examples show that GI's are not by themselves good solvents for the EB form of polyaniline. They also indicate that gel inhibitors are typically nonsolvents for EB at the higher total solids content of the present invention. One exception follows in the next example.

EXAMPLE 4

It might be expected that a bifunctional molecule containing both a secondary amine group (to complex with imine nitrogens of the polymer) and an amide group (to solvate the secondary amine groups of the polymer) would be simultaneously a gel-inhibitor and a solvent, and hence dissolve >15% w/w high molecular weight EB. One such bifunctional compound is 1-acetylpiperazine. This molecule has a secondary amine and an amide functional group situated within its heterocyclic ring structure. This bifunctionality allows not only good solvent solubility characteristics, but it also provides the secondary amine structure common to gel inhibitors. Specifically, 1.186 g of 1-acetylpiperazine was added to a 10 ml PTFE screw-cap vial and heated to 100° C. for 20 min. 308 mg of polyaniline was quickly added to this solvent with vigorous stirring for a few minutes. The solution became homogeneous, free from gel particles, in a short time. A thermally annealed film and an IP film were prepared in the usual fashion. Both films were flexible and of high quality, and had high conductivities after doping in 1 N HCl. This example shows that such bifunctional compounds can be used advantageously to dissolve EB at concentrations >20% w/w. However, these solutions had short gelation times which were more advantageously used by the addition of small amounts of other gel inhibitors.

EXAMPLE 5

Table 2 shows the results of 14 different experiments using different gel-inhibitcir compounds prepared with NMP solutions containing EB in the range of 19 to 21% (w/w), and variable amounts of GI to EB ranging from 0.7 to 2.5 (2.5 to 5.0 in the case of 2-methylaziridine). Table 2 also lists the subsequent doping effects on the conductivities (s=S/cm) and mechanical integrity of these thermally annealed films. The films indicated "Very Brittle" could not be measured for bulk conductivity. These results show that the physical properties (conductivity and mechanical properties) of thermally annealed films are sensitive to the mixing stoichiometry of the gel inhibitor relative to the EB repeat unit. In all instances, except for 2-methylaziridine, there is a significant decrease of bulk conductivity with increasing molar ratios of GI to EB. Similarly, at higher ratios of GI/EB, the heterocyclic amines tend to decrease the resulting mechanical properties of the thermally annealed films after acid doping, while the linear amines exhibit conductivity decreases but still preserve their mechanical integrity. This example once again shows that gel inhibitors are not cosolvents and that acid doped film and coating properties are quite sensitive to the molar ratio of GI to EB.

TABLE 2

| Gel Inhibitor (GI) | Mole Ratio GI/EB | s (S/cm) | Mechanical Property |
|---|---|---|---|
| Pyrrolidine | 1.3 | $3.1 \times 10^{-2}$ | F |
|  | 2.5 | $2.5 \times 10^{-5}$ | B |
| 2 Methylaziridine | 2.5 | 15 | F |
|  | 5.0 | 3.5 | B |
| (S)-(+)Pyrrolidine-2-methanol | 0.72 | $2.8 \times 10^{-3}$ | F |
|  | 1.4 | NM | VB |
| 3-Pyrroline | 1.4 | $2.8 \times 10^{-4}$ | F |
|  | 2.8 | NM | VB |
| 3-Pyrrolidinol | 1.4 | $7.0 \times 10^{-5}$ | F |
|  | 2.8 | NM | VB |

TABLE 2-continued

| Gel Inhibitor (GI) | Mole Ratio GI/EB | s (S/cm) | Mechanical Property |
|---|---|---|---|
| Dipropylamine | 1.3 | 30.0 | F |
|  | 2.4 | $3.2 \times 10^{-2}$ | F |
| Dibutylamine | 1.2 | 37.5 | F |
|  | 1.69 | $4.2 \times 10^{-2}$ | F |

NM = Not Measureable

EXAMPLE 6

Table 3 presents a summary of the results from 60 "quick survey" experiments in which variable quantities of gel inhibitors were added to NMP solutions to dissolve ~300 mg ($8.3 \times 10^{-4}$ mole) of [emeraldine base] EB as described above. In all cases, the concentration was generally greater than 20% (w/w), except for the (S)-(+)-2-(methoxymethyl)-pyrrolidine entry, where only 30 mg ($8.3 \times 10^{-5}$ mole) of polyaniline was used due to the limited availability of this GI. The results from Table 3 show the differences in measured conductivity between the HCl acid-doped thermally annealed films and HCl doped IP films formed by coagulating the wet film casting solutions in a nonsolvent (water) bath.

In general, Table 3 data shows that the IP films have higher conductivities than do the thermally cured dense films, and the resulting conductivities can range from 0 to 5 orders of magnitude in difference. These results suggest that [immersion precipitation] IP leads to effective removal of the residual GI by solvent exchange with the water bath. The "brittleness" found for the IP films is a consequence of the interconnecting pore structures observed by scanning electron microscopy (SEM). In a series of separate experiments, it was discovered that the addition of LiCl salts to the water coagulation bath leads to a noninterconnected, closed-cell, pore morphology which yields more mechanically robust and nonbrittle films. Modifications of the physical properties for thermally annealed and IP films and coatings can be achieved by manipulating: 1. The total mass of polymer in the solution at a constant GI/EB ratio, 2. Varying the dielectric properties of the nonsolvent used for the coagulation bath, e.g., adding salts, and 3. Varying the nature of the acid used for doping the polymer, e.g., organic acids vs. inorganic acids.

TABLE 3

| Solvent (NMP) (g) | Gel Inhibitor (g) | Conductivity of the Thermally Annealed Film (S/cm) | Conductivity of the Immersion Precipated Film (S/cm) | Molar Ratio of GI/EB |
|---|---|---|---|---|
| 1.025 | 2-Methylaziridine 0.120 | 15.0 (F) | 3.4 (SF) | 2.54 |
| 1.02 | Azitidine 0.090 | $10^{-5}$ (B) | NA | 1.9 |
| 1.02 | Pyrrolidine 0.082 | $4 \times 10^{-2}$ (F) | 0.11 (SF) | 1.39 |
| 1.025 | Hexamethylene-imine 0.104 | $3.7 \times 10^{-3}$ (F) | 5.1 (SF) | 1.26 |
| 1.034 | Heptamethylene-imine 0.104 | $5.73 \times 10^{-2}$ (F) | 2.5 (SF) | 1.11 |
| 1.031 | 3-Pyrroline 0.080 | $2.8 \times 10^{-4}$ (F) | $2 \times 10^{-2}$ (SF) | 1.40 |

TABLE 3-continued

| Solvent (NMP) (g) | Gel Inhibitor (g) | Conductivity of the Thermally Annealed Film (S/cm) | Conductivity of the Immersion Precipated Film (S/cm) | Molar Ratio of GI/EB |
|---|---|---|---|---|
| 1.021 | 3-Pyrrolidinol 0.101 | $7 \times 10^{-5}$ (F) | $4.37 \times 10^{-2}$ (SF) | 1.40 |
| 1.051 | (S)-(+)-pyrrolidine-2-methanol 0.060 | $1.3 \times 10^{-3}$ (F) | 0.58 (SF) | 0.72 |
| 1.02 | (R)-(−)-pyrrolidine-2-methanol 0.060 | $2.8 \times 10^{-3}$ (F) | 0.25 (SF) | 0.72 |
| 1.02 | 4-Ethyl-2-methyl-(3-methylbutyl)-oxazolidine 0.237 | 0.10 (F) | NA | 1.54 |
| 1.02 | (S)-(+)-(Anilinomethyl)-pyrrolidine 0.215 | NM | $1.8 \times 10^{-2}$ (B) | 1.47 |
| 1.03 | 1,3,3-Trimethyl-6-azabicyclo[3,2,1]-octane 0.195 | $1.1 \times 10^{-4}$ (F) | 0.14 (B) | 1.53 |
| 0.110 | (S)-(+)-2-(Methoxymethyl)-pyrrolidine 0.015 | $1.1 \times 10^{-4}$ (F) | 8.5 (B) | 1.57 |
| 1.075 | Indoline 0.148 | $5.5 \times 10^{-5}$ (F) | 0.54 (B) | 1.50 |
| 1.031 | Thiomorpholine 0.162 | $6.4 \times 10^{-1}$ (F) | $2.2 \times 10^{-2}$ (B) | 1.89 |
| 0.98 | Decahydroquinoline 0.160 | 0.17 (F) | 12.5 (F) | 1.39 |
| 1.004 | 2,5-Dimethyl-morpholine 0.122 | $7.4 \times 10^{-3}$ (F) | $4 \times 10^{-2}$ (B) | 1.28 |
| 1.029 | Diethylamine 0.087 | 28.2 (F) | 14.0 (B) | 1.43 |
| 1.029 | Dicyclohexyl-amine 0.205 | 78.0 (F) | 22.0 (B) | 1.36 |
| 1.048 | Dipropylamine 0.108 | 30 (F) | 12.5 (B) | 1.29 |
| 1.024 | Dibutylamine 0.124 | 37.5 (F) | 11.1 (B) | 1.16 |
| 1.032 | N-Methylhexyl-amine 0.124 | 1.0 (F) | 1.2 (SF) | 1.30 |
| 1.05 | 1-Aza-15-crown-5 0.248 | 3.0 (F) | 21.3 (SF) | 1.36 |
| 1.064 | 1,4-Dioxa-8-azaspiro[4.5]-decane 0.155 | $1.5 \times 10^{-2}$ (F) | $7.5 \times 10^{-2}$ (F) | 1.31 |
| 1.026 | 1,4,5,6-Tetrahydro-pyrimidine | $4.2 \times 10^{-3}$ (F) | 3.9 (SF) | 1.61 |
| 1.023 | 1,2,3,6-Tetrahydro-pyridine | $4.2 \times 10^{-3}$ (F) | 0.33 (SF) | 1.41 |
| 1.025 | 3,5-Dimethyl-piperidine | $2.4 \times 10^{-3}$ (F) | 1.53 (SF) | 1.63 |
| 1.020 | 3,3-Dimethylpiperidine 0.118 | $9.3 \times 10^{-4}$ (F) | 0.11 (SF) | 1.48 |
| 1.558 | Morpholine 0.110 | $1.2 \times 10^{-3}$ (F) | 0.18 (SF) | 1.25 |
| 1.038 | Piperidine 0.112 | $2.6 \times 10^{-5}$ (F) | 0.16 (SF) | 2.3 |

NA = not available

The data from Table 3 show that there are many types of gel-inhibitors, which when used in the preferred concentration ranges of the present invention, may be preferentially employed to dissolve greater than 20% of high molecular weight EB. These solutions can be advantageously used to fabricate thermally annealed free-standing films or coatings that may be rendered electrically conductive by immersion in an acid. Similarly, these solutions can be used advantageously to fabricate articles such as interconnecting and noninterconnecting porous articles by IP into nonsolvents.

EXAMPLE 7

Figure 3:
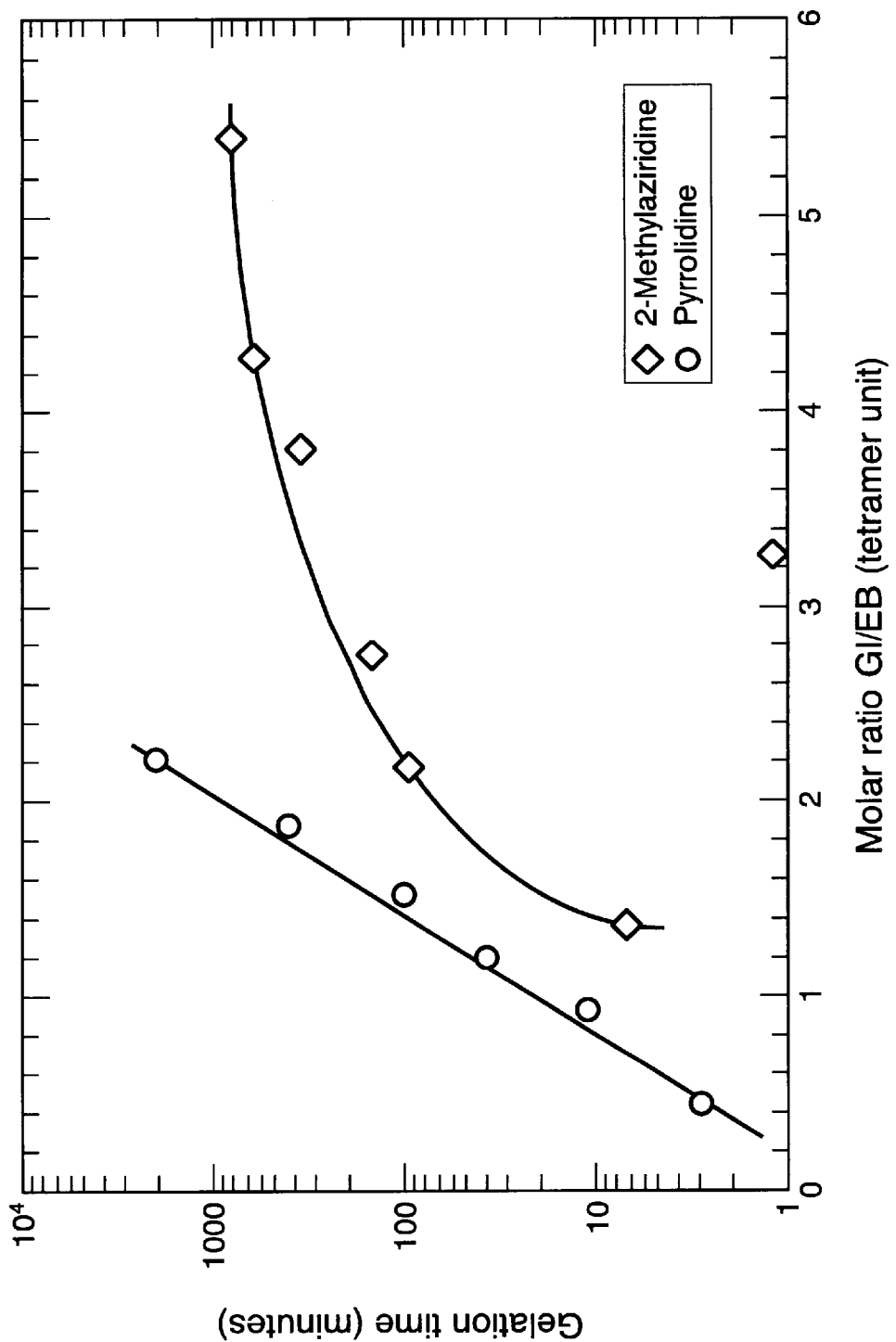
FIG. 3 is a graph of gelation time as a function of the molar ratio of GI to EB repeat unit for 2-methylazirdine and pyrrolidine GIs at 60° C., illustrating that higher GI/EB ratios generate longer gelation times.

FIG. 3 plots the data for gelation time versus the molar ratio of gel-inhibitor to EB repeat unit (GI's are 2-methylaziridine and pyrrolidine) for 20% w/w EB solutions in NMP at 60° C. It is clear that high GI/EB ratios lead to longer gelation times. For clarity, one such solution preparation is now described: 0.505 g of NMP and 79 mg of 2-methylaziridine [Aldrich, 90%, ($1.25 \times 10^{-4}$ mole)] were mixed in a 10 ml PTFE screw-cap vial and heated at 60° C. for 5 min.; 154 mg of EB ($4.3 \times 10^{-4}$ mole) were then added to this solution (GI/EB=2.90), stirred vigorously for several minutes, and then returned to the oven at 60° C. for 5 min. The vial was removed after each of nine, 5 min. time intervals, and vigorously stirred until a homogeneous, flowable liquid formed. The solution was then returned to the oven at 60° C. where it remained until it gelled. The gelation time was monitored from the moment the homogeneous EB solution formed until the time when the solution would no longer flow. Gelation time was defined as the time when, after the sample vial was tilted to an angle of 180°, the liquid phase no longer flowed to the bottom of the container. Each of the 2-methylaziridine and pyrrolidine solutions plotted in FIG. 3 was prepared and analyzed in this fashion.

FIG. 3 shows that the different gel-inhibitors of the present invention have different effects on the gelation times, and that higher ratios of GI/EB tend to give longer times to gelation. Much longer gelation times occur if such studies are carried out at lower temperatures. For example, the EB/NMP/2-MA solution described above gelled in 2.5 h. at 60° C. When the same solution composition was prepared and stored in the refrigerator (~2° C.) for more than 48 h., it remained a flowable gel-free liquid for this time interval.

Figure 4:
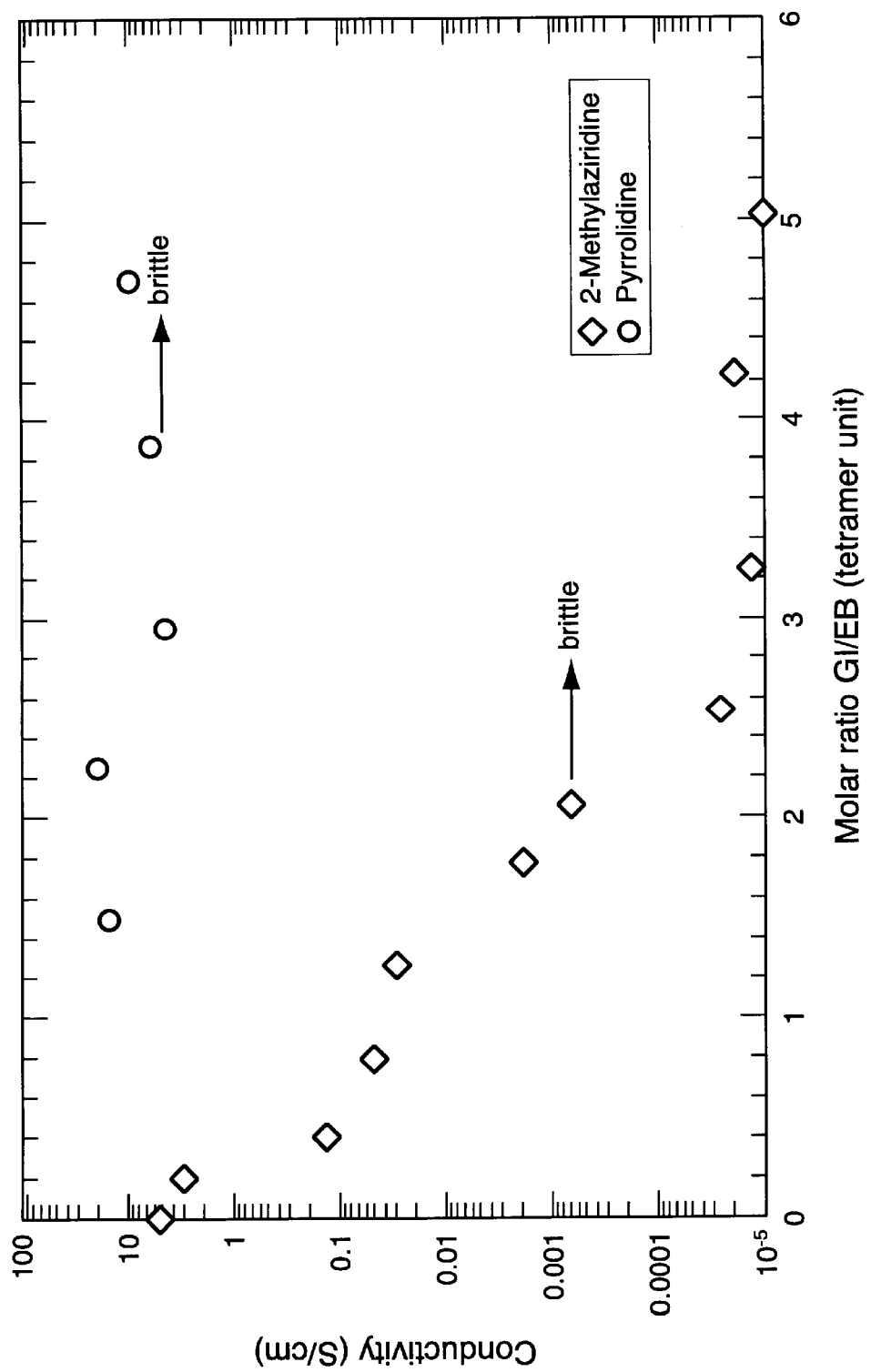
FIG. 4 is a graph of electrical conductivity as a function of the molar ratio of GI to EB repeat unit for 2-methylazirdine and pyrrolidine GIs at 20° C., illustrating that higher GI/EB ratios result in degradation of mechanical properties of resulting thermally annealed films and that certain GIs yield significantly reduced bulk electrical conductivities in such articles.

FIG. 4 is a plot of thermally annealed film conductivity results versus the molar ratio of gel-inhibitor to EB repeat unit (2-methylaziridine and pyrrolidine) used to prepare samples in NMP, all at concentrations >20% EB w/w. The samples were prepared as described above and the conductivities were measured at 20° C. by the four-point probe method (See Vander Pauw, supra). It is clear that at higher GI/EB ratios, reductions in thermally annealed film mechanical properties occur. Additionally, certain GI's of the present invention, e.g., pyrrolidine, exhibit substantially reduced bulk conductivities for films and coatings when compared with other GI's such as 2-methylaziridine at the same GI/EB ratios. FIG. 4 shows that increasing the GI/EB ratio can in some instances decrease conductivity and mechanical integrity for thermally annealed films and coatings, while in other cases, only mechanical properties are degraded.

EXAMPLE 8

A solution for spinning EB solid fibers was prepared as follows: 31.32 g of N-methyl-2-pyrrolidinone (NMP) was mixed with 4.879 g ($7.9 \times 10^{-2}$ mole) of 2-methylaziridine [90%, 2-MA, Aldrich]. This mixture was placed in a 60 ml glass jar with a teflon lined screw cap at 60° C. for 1 h., after which 9.109 g ($2.5 \times 10^{-2}$ mole) of EB was quickly added to this NMP/2-MA mixture (GI/EB=3.1), and vigorously stirred for a few minutes to wet the polymer powder. The glass jar was tightly sealed and returned to the oven set at 100° C. for about 30 min. During this time, the EB/NMP/2-MA mixture was removed every 10 min. and vigorously stirred. After this time, a flowable homogeneous liquid solution free from gel particles formed. The concentration of EB in this solvent system was 20.1 wt %.

This EB solution was transferred to a hydraulic stainless steel cylinder and cooled to room temperature. A gear pump motor, fed by a nitrogen gas at 100 psi, was used to drive the EB fluid through ⅜ in. stainless steel tubing, and through a spinnerette (500 mm O.D.), at a pressure of 250 to 1,000 psi. The polymer solution was extruded through a 1 in. air-gap directly into a water coagulation bath (0° C.) where the solvent and GI were removed from the nascent polyaniline fiber by de-mixing and solvent/nonsolvent exchange in the bath. The take-up speed was varied between 3 to 10 feet per min. The nascent fiber was continuously wound on a series of two water bath godets maintained at 15° C., and collected on a bobbin by means of a Leesona Winder. The fibers were placed in water extraction baths for 48 h. to remove residual solvent and dried under dynamic vacuum. FIG. 5 shows a scanning electron micrograph of the resulting fiber. This example illustrates the utility of the solutions of the present invention for solid fiber spinning.

The EB fiber was stretch-aligned in the following manner: A soldering iron was wrapped with a piece of teflon film and heated to 120° C. by means of a Variac temperature controller. The fiber was stretched across the soldering iron tip under tension. As the heat softened the fiber, a draw stretch ratio of 3 to 5 times was obtained. This mechanical stretching reduced the fiber diameter from 450 μm to about 100 μm. The maximum draw ratio depends on the amount of residual plasticizing solvent and the temperature of the hot tip. Overdrying the fiber may reduce the drawing ratio due to the lower NMP content. The conductivity of the air-dried unstretched fiber was measured to be 1 to 5 S/cm and the air-dried stretched fibers (about 4 times their unstretched length) had a conductivity greater than 20 S/cm. This example shows that the conductivity of fibers can be increased through stretch alignment which leads to increased electronic mobility.

Six inch segments of the stretched and unstretched EB fiber were immersed in 400 ml of their respective aqueous acid solutions for 48 h. They were removed from the doping solution, dried under dynamic vacuum for another 48 h., and their conductivity measured. The acid solutions used for doping the solid fibers were: 1.5 N HCl, 1N acetic acid, and an aqueous solution of benzenephosphinic acid (BPA) (pH=−0.37). The designation SF means somewhat flexible and is used if the fiber can be bent more than 90° without breaking, but cannot be bent more than 180°. These results are shown in Table 4 hereof.

TABLE 4

| Acid | HCl | Acetic Acid | Benzene phosphinic acid | Undoped |
|---|---|---|---|---|
| Conductivity of the stretched fiber with a draw ratio of 4 | 4.8 (B) | 5.5 (F) | 8.3 (SF) | Insulator (F) |
| Conductivity of the unstretched fiber | 0.31 (SF) | 0.71 (F) | 0.049 (SF) | Insulator (F) |

The conductivity of a stretch aligned fiber is generally 1 to 2 orders of magnitude greater than that for an unstretched fiber. From this example one may observe that: (IG) stretch-alignment of fibers increases electronic mobility; and (b) organic acids have better mechanical properties in the doped fibers.

EXAMPLE 9

A mixture of 1.022 g of 1-acetyl-2-piperidone and 160 mg of 2-methylaziridine ($2.52 \times 10^{-3}$ mole) was heated at 80° C. for 15 min., after which 306 mg ($8.45 \times 10^{-4}$ mole) of EB (GI/EB=2.98) was rapidly added to this solution with vigorous stirring. The sample was returned to the oven at this temperature until the homogeneous flowable liquid solution formed. The solution was applied to the surface of a 4 in.×4 in. glass slide and then thermally annealed at 120° C. for 60 min. The resulting film was immersed in water, and after a few minutes, it delaminated from the glass surface. The hot pin described in Example 8 was used at 120° C. to mechanically draw the film to 2.6 times its original length. The conductivity of the doped, unstretched film was 20.5 S/cm and the conductivity of the stretched film was 50.3 S/cm. This Example shows that films formed by the solutions of the present invention can be mechanically stretched to increase electronic mobility and increase conductivity.

EXAMPLE 10

Table 5 shows the results from a quick screening of solvents observed to work with the gel-inhibitors of the present invention randomly chosen for this study. By way of example, 52 mg of 3-pyrrolidinol ($6.00 \times 10^{-4}$ mole) was mixed with 508 mg of N,N-dimethyacetamide and heated at 60° C. for 5 min., after which 156 mg of EB ($4.31 \times 10^{-4}$ mole) was added to this mixture (GI/EB=1.39). The solution stirred vigorously for 1 min. and, returned to the oven for 10 min. until homogeneous flowable liquid solution formed. All the examples that are listed in Table 5 have an EB concentration of >20% w/w. Thermally annealed films were obtained by evaporating the solvent from the cast wet film at 120° C. for 1 h. The films were immersed in 1 N HCl for several hours, air dried, and measured for respective conductivities.

TABLE 5

| Solvent | Gel Inhibitor | Conductivity (S/cm) and Mechanical Properties | Molar Ratio GI/EB |
| --- | --- | --- | --- |
| N,N-Dimethy-acetamide | 3-Pyrrolidinol | $6.0 \times 10^{-3}$ (F) | 1.39 |
| Dimethylsulfoxide | 2-Methylaziridine | 13.5 (F) | 2.9 |
| N-Methyl-2-pyrrolidinone | Diethylamine | 28.2 (F) | 1.43 |
| 1-Methyl-2-piperidone | 2-Methyaziridine | 20.5 (F) | 3.0 |
| Hexamethylphosphoramide | 2,6-Dimethyl-morpholine | $5.6 \times 10^{-2}$ (F) | 1.31 |
| N-Ethyl-2-pyrrolidinone | Dipropylamine | $3.2 \times 10^{-2}$ (F) | 1.38 |
| N,N-Dimethyl-propionamide | 3-Pyrroline | $3.14 \times 10^{-2}$ (B) | 1.49 |

This Example shows that new solvent systems can readily be found according to the teachings of the present invention.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for preparing polyaniline films, which comprises the steps of:
    (a) preparing a solution having between 15% and 30% by weight of ($M_w$)>120,000, ($M_n$)>30,000 emeraldine base form of polyaniline by mixing a solvent for polyaniline with a secondary amine such that the molar ratio of secondary amine to polyaniline tetramer repeat unit is between 0.1 and 5.0, forming thereby a solution, and dissolving a chosen quantity of polyaniline in the solution thus prepared;
    (b) coating a substrate with the solution; and
    (c) thermally annealing the coated substrate.

2. The method for preparing polyaniline films as described in claim 1, wherein the molar ratio of secondary amine to polyaniline tetramer repeat unit is between 0.5 and 3.

3. The method for preparing polyaniline films as described in claim 1, wherein the molar ratio of secondary amine to polyaniline tetramer repeat unit is between 1 and 2.

4. The method for preparing polyaniline films as described in claim 1, further comprising the step of heating the solution before said step of dissolving the polyaniline.

5. The method for preparing polyaniline films as described in claim 1, wherein the solvent is chosen from the group consisting of: N-methyl-2-pyrrolidinone, N-ethyl-2-pyrrolidinone, 1-cyclohexyl-2-pyrrolidinone, 1-methyl-2-piperidone, N-methylcaprolactam, 1,5-dimethyl-2-pyrrolidinone, 2-pyrrolidinone, 1,3-dimethyl-2-imidazolidinone, 1,3-dimethyl-3,4,5,6-tetrahydro-2(1H)-pyrimidinone, 1-methyl-2-pyridone, 1-acetylpyrrolidine, 1-acetylpiperdine, 1-acetylpiperazine, 4-acetylmorpholine, 1-acetyl-3-methylpiperidine, N,N-dimethylpropionamide, N,N,N',N'-tetramethyurea, N,N-dimethylacetamide, dimethylsulfoxide, tetramethylene sulfoxide, N-hexamethylphosphoramide, δ-valerolactam, N,N,2-trimethylpropionamide, and mixtures thereof.

6. The method for preparing polyaniline films as described in claim 1, wherein the secondary amines are selected from the group consisting of: 2-methylaziridine, azetidine, pyrrolidine, piperidine, hexamethyleneimine, heptamethyleneimine, 3-pyrroline, 3-pyrrolidinol, (R)-(−)-pyrrolidine-2-methanol, (S)-(+)-pyrrolidine-2-methanol, 4-ethyl-2-methyl-(3 methylbutyl)oxazolidine, (S)-(+)-(anilinomethyl)pyrrolidine, 1,3,3-trimethyl-6-azabicyclooctane, (S)-(+)-2 (methoxymethyl)pyrrolidine, indoline, thiomorpholine, decahydroguinoline, 2,6-dimethylmorpholine, diethylamine, dicyclohexylamine, dipropylamine, dibutylamine, N-methylhexylamine, 1-aza-15-crown-5, 1,2,3,6-tetrahydropyridine, 1,4,5,6-tetrahydropyrimidine, 1,4-dioxa-8-azaspiro-decane, 3,3-dimethylpiperidine, morpholine, 3,5-dimethylpiperidine, and mixtures thereof.

7. The method for preparing polyaniline films as described in claim 1, further comprising the step of immersing the film in acid solution to render the film conducting.

8. A method for preparing polyaniline films, which comprises the steps of:
    (a) preparing a solution having between 15% and 30% by weight of ($M_w$)>120,000, ($M_n$)>30,000 emeraldine base form of polyaniline by dissolving a chosen amount of polyaniline in a bifunctional solvent therefor having both an amide group and a secondary amine group;
    (b) coating a substrate with the solution; and
    (c) thermally annealing the coated substrate.

9. The method for preparing polyaniline films as described in claim 8, further comprising the step of heating the solvent before said step of dissolving the polyaniline.

10. The method for preparing polyaniline films as described in claim 8, wherein the bifunctional solvent includes 1-acetylpiperazine.

11. The method for preparing polyaniline films as described in claim 8, further comprising the step of immersing the film in acid solution to render the film conducting.

12. A method for preparing polyaniline films, which comprises the steps of:
    (a) preparing a solution having between 15% and 30% by weight of ($M_w$)>120,000, ($M_n$)>30,000 emeraldine base form of polyaniline by mixing a solvent for polyaniline with a secondary amine such that the molar ratio of secondary amine to polyaniline tetramer repeat unit is between 0.1 and 5.0, forming thereby a solution, and dissolving a chosen quantity of polyaniline in the solution thus prepared;

(b) coating a substrate with the solution;

(c) immersing the coated substrate into a non-solvent bath, whereby the polyaniline precipitates forming a film; and (d) drying the film.

13. The method for preparing polyaniline films as described in claim 12, wherein the molar ratio of secondary amine to polyaniline tetramer repeat unit is between 0.5 and 3.

14. The method for preparing polyaniline films as described in claim 12, wherein the molar ratio of secondary amine to polyaniline tetramer repeat unit is between 1 and 2.

15. The method for preparing polyaniline films as described in claim 12, further comprising the step of heating the solution before said step of dissolving the polyaniline.

16. The method for preparing polyaniline films as described in claim 12, wherein the solvent is chosen from the group consisting of: N-methyl-2-pyrrolidinone, N-ethyl-2-pyrrolidinone, 1-cyclohexyl-2-pyrrolidinone, 1-methyl-2-piperidone, N-methylcaprolactam, 1,5-dimethyl-2-pyrrolidinone, 2-pyrrolidinone, 1,3-dimethyl-2-imidazolidinone, 1,3-dimethyl-3,4,5,6-tetrahydro-2(1H)-pyrimidinone, 1-methyl-2-pyridone, 1-acetylpyrrolidine, 1-acetylpiperdine, 1-acetylpiperazine, 4-acetylmorpholine, 1-acetyl-3-methylpiperidine, N,N-dimethylpropionamide, N,N,N',N'-tetramethyurea, N,N-dimethylacetamide, dimethylsulfoxide, tetramethylene sulfoxide, N-hexamethylphosphoramide, δ-valerolactam, N,N,2-trimethylpropionamide, and mixtures thereof.

17. The method for preparing polyaniline films as described in claim 12, wherein the secondary amines are selected from the group consisting of: 2-methylaziridine, azetidine, pyrrolidine, piperidine, hexamethyleneimine, heptamethyleneimine, 3-pyrroline, 3-pyrrolidinol, (R)-(−)-pyrrolidine-2-methanol, (S)-(+)-pyrrolidine-2-methanol, 4-ethyl-2-methyl-(3-methylbutyl)oxazolidine, (S)-(+)-(anilinomethyl)pyrrolidine, 1,3,3-trimethyl-6-azabicyclo octane, (S)-(+)-2 (methoxymethyl)pyrrolidine, indoline, thiomorpholine, decahydroquinoline, 2,6-dimethylmorpholine, diethylamine, dicyclohexylamine, dipropylamine, N-methylhexylamine, 1-aza-15-crown-5, 1,2,3,6-tetrahydropyridine, 1,4,5,6-tetrahydropyrimidine, 1,4-dioxa-8-azaspiro-decane, 3,3-dimethylpiperidine, morpholine, 3,5-dimethylpiperidine, and mixtures thereof.

18. The method for preparing polyaniline films as described in claim 12, further comprising the step of stretching the film to improve the mechanical properties thereof.

19. The method for preparing polyaniline films as described in claim 18, further comprising the step of immersing the stretched film in acid solution to render the film conducting.

20. The method for preparing polyaniline films as described in claim 12, wherein the dielectric properties of the non-solvent bath are adjusted in order to improve the mechanical properties of the polyaniline film.

21. A method for preparing polyaniline films, which comprises the steps of:

(a) preparing a solution having between 15% and 30% by weight of $(M_w)>120,000$, $(M_n)>30,000$ emeraldine base form of polyaniline by dissolving a chosen amount of polyaniline in a bifunctional solvent therefor having both an amide group and a secondary amine group;

(b) coating a substrate with the solution;

(c) immersing the coated substrate into a non-solvent bath, whereby the polyaniline precipitates forming a film; and (d) drying the film.

22. The method for preparing polyaniline films as described in claim 21, further comprising the step of heating the solvent before said step of dissolving the polyaniline.

23. The method for preparing polyaniline films as described in claim 21, wherein the bifunctional solvent includes 1-acetylpiperazine.

24. The method for preparing polyaniline films as described in claim 21, further comprising the step of stretching the film to improve its mechanical properties.

25. The method for preparing polyaniline films as described in claim 24, further comprising the step of immersing the film in acid solution to render the film conducting.

26. The method for preparing polyaniline films as described in claim 21, wherein the dielectric properties of the non-solvent bath are adjusted in order to improve the mechanical properties of the polyaniline film.

* * * * *